(12) United States Patent
Ye et al.

(10) Patent No.: US 11,874,475 B2
(45) Date of Patent: Jan. 16, 2024

(54) VORTEX BEAM-EXCITED PRECISION GRATING DISPLACEMENT MEASUREMENT APPARATUS AND MEASUREMENT METHOD

(71) Applicant: ZHENGZHOU UNIVERSITY OF LIGHT INDUSTRY, Zhengzhou (CN)

(72) Inventors: Guoyong Ye, Zhengzhou (CN); Yalin Zhang, Zhengzhou (CN); Tao Yuan, Zhengzhou (CN); Shaobo Jin, Zhengzhou (CN); Tong Wang, Zhengzhou (CN); Xuling Liu, Zhengzhou (CN); Hui Wang, Zhengzhou (CN)

(73) Assignee: ZHENGZHOU UNIVERSITY OF LIGHT INDUSTRY, Zhengzhou (CN)

( * ) Notice: Subject to any disclaimer, the term of this patent is extended or adjusted under 35 U.S.C. 154(b) by 0 days.

(21) Appl. No.: 17/993,362

(22) Filed: Nov. 23, 2022

(65) Prior Publication Data
US 2023/0359049 A1 Nov. 9, 2023

(30) Foreign Application Priority Data
May 7, 2022 (CN) .......................... 202210494629.0

(51) Int. Cl.
*G02B 27/09* (2006.01)
*G02B 27/10* (2006.01)
*G01B 11/02* (2006.01)

(52) U.S. Cl.
CPC .......... *G02B 27/0938* (2013.01); *G01B 11/02* (2013.01); *G02B 27/0916* (2013.01); *G02B 27/1026* (2013.01)

(58) Field of Classification Search
CPC ............ G02B 27/0938; G02B 27/0916; G02B 27/1026
See application file for complete search history.

(56) References Cited

FOREIGN PATENT DOCUMENTS

| CN | 209894118 U | 1/2020 |
|---|---|---|
| CN | 112097652 A | 12/2020 |

(Continued)

OTHER PUBLICATIONS

Xia, Hao-jie, et al., "Signal Processing Method for Displacement Measurement Interferometry Using Vortex Beams," Optics and Precision Engineering, 28:9 (2020).

(Continued)

*Primary Examiner* — Joseph P Martinez
(74) *Attorney, Agent, or Firm* — Troutman Pepper Hamilton Sanders LLP (Rochester)

(57) ABSTRACT

A vortex beam-excited precision grating displacement measurement apparatus, which performs displacement measurement by taking a vortex beam carrying topological charges as an excitation light source of a grating and by using the interference of a ±m-order diffracted vortex beam. In the vortex beam-excited precision grating displacement measurement method and apparatus, the displacement p/m of the measured displacement corresponds to the rotation of a circle 2π rad of an interference petal pattern, and then the rotation of 1° of the interference petal pattern corresponds to the measured displacement amount of p/360m. Compared with a conventional grating measurement method, the present disclosure provides a grating interference sensing signal that realizes a higher optical subdivision rate itself.

1 Claim, 2 Drawing Sheets

(56) References Cited

FOREIGN PATENT DOCUMENTS

| CN | 112484646 A | 3/2021 |
| CN | 113607063 A | 11/2021 |
| CN | 112097652 * | 12/2021 | ............. G02B 27/28 |
| CN | 113819846 A | 12/2021 |
| CN | 114739295 B | 7/2022 |

OTHER PUBLICATIONS

First Office Action, National Intellectual Property Administration of the People's Republic of China, dated Jan. 20, 2023, for Application/Patent No. 202210494629.0.

Second Office Action, National Intellectual Property Administration of the People's Republic of China, dated Mar. 25, 2023, for Application/Patent No. 202210494629.0.

Dong'e, Zhao, et al., "Measurement of Micro-Displacement Based on the Interference of Vortex Beams and Spherical Wave," Infrared and Laser Engineering, 49:4 (2020).

\* cited by examiner

VORTEX BEAM-EXCITED PRECISION GRATING DISPLACEMENT MEASUREMENT APPARATUS AND MEASUREMENT METHOD

CROSS-REFERENCE TO RELATED APPLICATION

This patent application claims the benefit and priority of Chinese Patent Application No. 202210494629.0, filed with the China National Intellectual Property Administration on May 7, 2022, the disclosure of which is incorporated by reference herein in its entirety as part of the present application.

FIELD

The present disclosure relates to the technical field of precision measurement, and in particular, to a vortex beam-excited precision grating displacement measurement method and apparatus.

BACKGROUND

Precision displacement measurement technology is a leading technical basis for the development of precision engineering and frontier science. A precision grating displacement measurement apparatus, as one of the most promising cross-scale nanometer measurement technologies, is a core functional component that determines the precision of high-end equipment. Its application scenarios have expanded from numerical control machine tool to semiconductor manufacturing equipment.

The measurement resolution of the precision grating displacement measurement apparatus is determined by grating pitch and subdivision rate (electronic subdivision and optical subdivision). However, there are mainly the following problems in precision grating displacement measurement at present:

1) Continuous reduction of grating pitch: The measurement resolution is improved by manufacturing grating with a smaller pitch. However, manufacturing gratings with small spacing and large area is a huge challenge. It highly depends on the development of manufacturing processes, the precision of manufacturing equipment, the control of process parameters, the guarantee of environmental conditions, etc.
2) Implementation of electronic subdivision method: The measurement resolution is improved by performing high-degree electronic subdivision on grating sensing signals, such as an arctangent subdivision method and a phase locked loop subdivision method. However, the greater the electronic subdivision rate is, the lower the dynamic response speed of the grating measurement apparatus is. In addition, a subdivision error must be considered; and otherwise, it is of no practical significance to blindly improve the subdivision rate.
3) Design of optical subdivision structure: Optical subdivision is an effective strategy to improve the measurement resolution of a grating displacement measurement apparatus. Optical subdivision is realized by employing high-order diffracted beams or multiple-times diffracted beams. Optical subdivision method will not affect the dynamic response characteristics of the grating measurement apparatus. However, it will significantly reduce the energy of the diffracted beams participating in interference, thereby affecting the signal intensity and the signal-to-noise ratio. In the actual design of a grating measurement apparatus, optical subdivision rate of 2 or 4 is generally obtained. There is an urgent need to invent a new high-degree optical subdivision method to improve the resolution and precision of grating measurement apparatus.

SUMMARY

In order to overcome the shortcomings of the prior art, the present disclosure provides a vortex beam-excited precision grating displacement measurement apparatus and measurement method. Compared with the conventional grating measurement method, due to the spiral phase characteristics of a vortex beam, the present disclosure realizes a higher optical subdivision rate through the interference of the diffracted vortex beams. Meanwhile, subsequent electronic subdivision of the interference sensing signal is changed from conventional phase subdivision to circular angle subdivision. A circumference has the natural reference of 360°, which avoids the influence of the quality of the interference sensing signal on the conventional phase interpolation, and improves the resolution and the precision of precision grating measurement in principle.

In order to achieve the abovementioned objective, the technical solution adopted by the present disclosure is that:

A vortex beam-excited precision grating displacement measurement apparatus includes an exciter. A phase modulation device is arranged at an outlet of the exciter. A reflecting mirror is directly arranged in front of the phase modulation device. A grating is arranged on a left side of the reflecting mirror. The apparatus further includes two reflecting mirrors and three polarization beam splitting prisms. The two reflecting mirrors are respectively a first reflecting mirror and a second reflecting mirror. The first reflecting mirror and the second reflecting mirror are arranged correspondingly up and down. The three polarization beam splitting prisms are respectively a first polarization beam splitting prism, a second polarization beam splitting prism, and a third polarization beam splitting prism. The first polarization beam splitting prism and the second polarization beam splitting prism are located in one optical path. The first polarization beam splitting prism and the third polarization beam splitting prism are located in the other optical path. The three polarization beam splitting prisms are arranged at right angles. A first ¼ wave plate is arranged between the first polarization beam splitting prism and the second polarization beam splitting prism. A second ¼ wave plate is arranged between the first polarization beam splitting prism and the third polarization beam splitting prism. A first photoelectric detector and a second photoelectric detector are arranged on both sides of the second polarization beam splitting prism. A third photoelectric detector and a fourth photoelectric detector are arranged on both sides of the third polarization beam splitting prism.

Further, the phase modulation device is a spiral phase plate or a spatial light modulator.

Further, a Dove prism is arranged between the grating and the second reflecting mirror.

A vortex beam-excited precision grating displacement measurement method includes the following steps that:

Step 1): emergent laser of the laser travels through a phase modulation device to generate a vortex beam; the vortex beam is reflected to a grating through a reflecting mirror and is diffracted to generate +m-order diffracted light and −m-order diffracted light; the laser emitted from the laser is converted into a Laguerre- Gaussian vortex beam carrying orbital angular momentum through a spatial light modulator, and the characteristics of the vortex beam are mainly characterized by a radial index n and an azimuth direction index l;

Step 2): the +m-order diffracted light enters a first polarization beam splitting prism after being reflected by the first reflecting mirror, and the −m-order diffracted light carries opposite topological charges after traveling through a Dove prism and then enters the first polarization beam splitting prism through a second reflecting mirror;

Step 3): light is divided into two beams through the first polarization beam splitting prism; in one light path, +m-order S light and −1-order P light travel through a first ¼ wave plate; and in the other light path, +m-order P light and −1-order S light travel through a second ¼ wave plate;

Step 4): the two paths of light respectively enter a second polarization beam splitting prism and a third polarization beam splitting prism again and then are divided into two beams again to respectively form circularly polarized light to interfere with each other, so as to generate four coherent patterns finally;

Step 5): when a grating displaces, the ±m-order diffracted light generate a phase difference $\Delta\phi$, at this moment, the phase change caused by a measured displacement amount corresponds to a rotation angle of an equally angular distributed interference pattern, and a rotation direction corresponds to a measured displacement direction; and the measured grating displacement can be demodulated from rotation angle information of the interference pattern.

Further, vortex light field expressions with the azimuth direction indexes of l and −l are respectively abbreviated as:

$$E_l(r,\theta)=R_l(r)\exp(il\theta) \quad (1)$$

$$E_{-l}(r,\theta)=R_l(r)\exp(-il\theta) \quad (2)$$

An electric field amplitude generated by the coherence of the vortex beams is:

$$E_l(r,\theta)+E_{-l}(r,\theta)=2R_l(r)\cos(l\theta) \quad (3)$$

When the grating displaces, the +m-order diffracted light and the −m-order diffracted light will generate a phase difference $\Delta\phi$ due to a Doppler shift effect of diffracted light, and the expression thereof is:

$$\Delta\phi = 4m\pi\frac{x}{p} \quad (4)$$

Where, x is the displacement that the grating displaces, and p is a grating pitch. The above formula shows that the grating displacement x can be solved by the phase difference $\Delta\phi$ between the +m-order diffracted light and the −m-order diffracted light. At this moment, the electric field amplitude generated by the coherence of the two diffracted beams is:

$$E_l(r,\theta) + E_{-l}(r,\theta) = R_l(r)\{\exp[i(l\theta + \Delta\phi)] + \exp(-il\theta)\} \quad (5)$$
$$= 2R_l(r)\exp(i\Delta\phi/2)\cos(l\theta + \Delta\phi/2)$$
$$= 2R_l(r)\exp\left(i\frac{2m\pi x}{p}\right)\cos\left(l\theta + \frac{2m\pi x}{p}\right)$$

It can be seen from Formula (5) that the phase change $\Delta\phi$ caused by the measured displacement amount x corresponds to a rotation angle of an equally angular distributed interference pattern, and the rotation direction corresponds to the measured displacement direction. In the vortex beam-excited precision grating displacement measurement method, the displacement p/m of the measured displacement corresponds to the rotation of a circle $2\pi$ of an interference petal pattern, and then the rotation of 1° of the interference petal pattern corresponds to the measured displacement amount of p/360m.

Compared with the prior art, the present disclosure has the beneficial effects that:

1) The phase modulation device, which may be a spiral phase plate or a spatial light modulator, is added on an emergent light path of a laser source, so as to synthesize a vortex beam with topological charges, thereby exciting the grating by using the vortex beam.

2) Coherence pattern of vortex beams and its conjugated vortex beam have special light intensity distribution. By using the characteristics, an electronic subdivision processing method of a grating interference signal can be changed from phase subdivision to circular angle subdivision. Moreover, a circumference has the natural reference of 360°, which avoids the influence of the quality of the grating interference sensing signal on the effectiveness of the phase interpolation, and improves the resolution and the precision of the grating measurement in principle.

Figure 1:
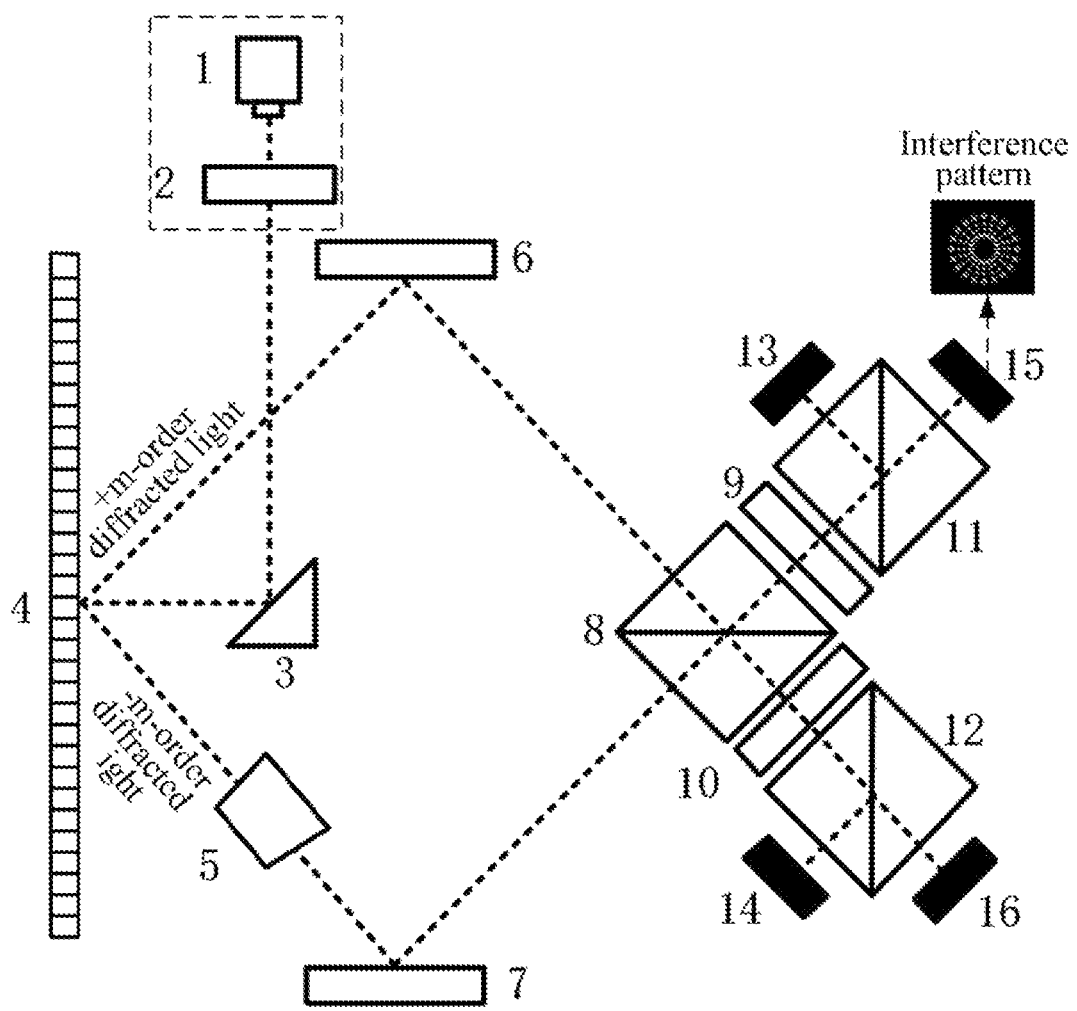
FIG. 1 is a front view of a vortex beam-excited precision grating displacement measurement apparatus of an embodiment.

Reference signs in the drawings: exciter 1; phase modulation device 2; reflecting mirror 3; grating 4; Dove prism 5; first reflecting mirror 6; second reflecting mirror 7; first polarization beam splitting prism 8; first ¼ wave plate 9; second ¼ wave plate 10; second polarization beam splitting prism 11; third polarization beam splitting prism 12; first photoelectric detector 13; third photoelectric detector 14; second photoelectric detector 15; and fourth photoelectric detector 16.

DETAILED DESCRIPTION

Examples of the present disclosure described in detail in combination with the accompanying drawings and embodiments.

Figure 2:
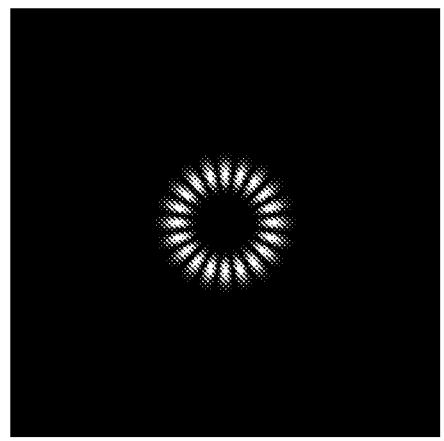
FIG. 2 is a coherent pattern generated by a vortex beam used in the embodiment, where l=10, and n=0.
Figure 3:
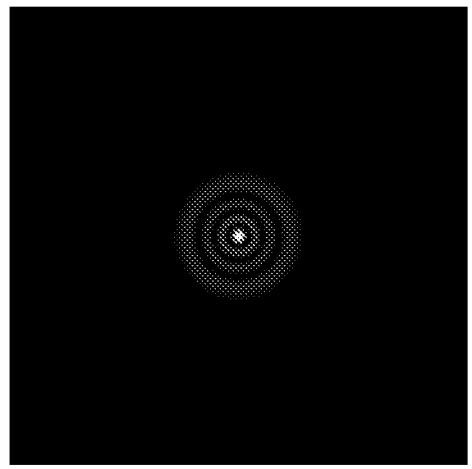
FIG. 3 is a coherent pattern generated by a vortex beam used in the embodiment, where l=0, and n=3.
Figure 4:
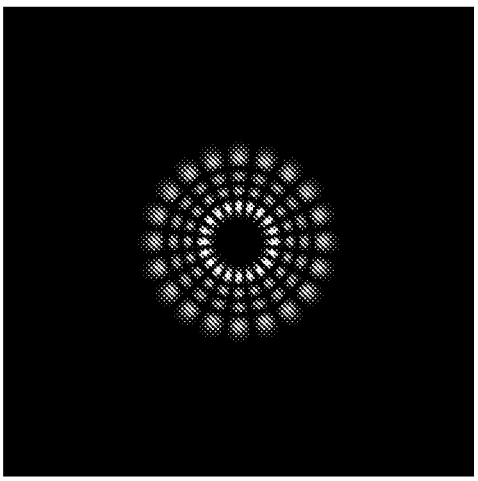
FIG. 4 is a coherent pattern generated by a vortex beam used in the embodiment, where l=10, and n=3.

Embodiment: Referring to FIG. 1 and FIG. 2, a vortex beam-excited precision grating displacement measurement apparatus includes an exciter 1. A phase modulation device 2 is arranged at an outlet of the exciter 1. A reflecting mirror 3 is directly arranged in front of the phase modulation device 2. A grating 4 is arranged on a left side of the reflecting mirror 3. The apparatus further includes two reflecting mirrors and three polarization beam splitting prisms. The two reflecting mirrors are respectively a first reflecting mirror 6 and a second reflecting mirror 7. The first reflecting mirror 6 and the second reflecting mirror 7 are arranged correspondingly up and down. The three polarization beam splitting prisms are respectively a first polarization beam splitting prism 8, a second polarization beam splitting prism 11, and a third polarization beam splitting prism 12. The first polarization beam splitting prism 8 and the second polarization beam splitting prism 11 are located in one optical path. The first polarization beam splitting prism 8 and the third polarization beam splitting prism 12 are located in the other optical path. The three polarization beam splitting prisms are arranged at right angles. A first ¼ wave plate 9 is arranged between the first polarization beam splitting prism 8 and the second polarization beam splitting prism 11. A second ¼ wave plate 10 is arranged between the first polarization beam splitting prism 8 and the third polarization beam splitting prism 12. A first photoelectric detector 13 and a second photoelectric detector 15 are arranged on both sides of the second polarization beam splitting prism 11. A third photoelectric detector 14 and a fourth photoelectric detector 16 are arranged on both sides of the third polarization beam splitting prism 12.

Preferably in this example, the phase modulator device 2 is a spiral phase plate or a spatial light modulator.

Preferably in this example, a Dove prism 5 is arranged between the grating 4 and the second reflecting mirror 7.

In this example, a vortex beam-excited precision grating displacement measurement method includes the following steps that:

Step 1): emergent laser of the laser 1 travels through a phase modulation device 2 to generate a vortex beam; the vortex beam is reflected to a grating 4 through a reflecting mirror 3 and is diffracted to generate +m-order diffracted light and −m-order diffracted light; the laser emitted from the laser 1 is converted into a Laguerre-Gaussian vortex beam carrying orbital angular momentum through a spatial light modulator, and the characteristics of the vortex beam are mainly characterized by a radial index n and an azimuth direction index l;

Step 2): the +m-order diffracted light enters a first polarization beam splitting prism 8 after being reflected by the first reflecting mirror 6, and the −m-order diffracted light carries opposite topological charges after traveling through a Dove prism 5 and then enters the first polarization beam splitting prism 8 through a second reflecting mirror 7;

Step 3): light is divided into two beams through the first polarization beam splitting prism; in one light path, +m-order S light and −1-order P light travel through a first ¼ wave plate 9, and in the other light path, +m-order P light and −1-order S light travel through a second ¼ wave plate 10;

Step 4): the two paths of light respectively enter a second polarization beam splitting prism 11 and a third polarization beam splitting prism 12 again and then are divided into two beams again to respectively form circularly polarized light to interfere with each other, so as to generate four coherent patterns finally;

Step 5): when a grating displaces, the +m-order diffracted light and the −m-order diffracted light generate a phase difference Δϕ, at this moment, the phase change caused by a measured displacement amount corresponds to a rotation angle of an equally angular distributed interference pattern, and a rotation direction corresponds to a measured displacement direction. Therefore, the measured grating displacement can be demodulated from rotation angle information of the interference pattern.

When the radial index n is different from the azimuth direction index l, the interference pattern of a conjugate vortex beam of the ±m order is shown in FIG. 2. By means of the 360° natural reference of the circumference, the rotation center of each interference fringe and interference pattern is located through image processing fitting, which can realize the high-resolution precision measurement of a rotation angle of the interference pattern and the corresponding measured displacement. In the interference pattern, finer interference fringes and more uniform and clear interference fringes are more beneficial to improving the signal processing precision and measurement resolution.

Further, vortex light field expressions with the azimuth indexes of 1 and −1 are respectively abbreviated as:

$$E_l(r,\theta)=R_l(r)\exp(il\theta) \quad (1)$$

$$E_{-l}(r,\theta)=R_l(r)\exp(-il\theta) \quad (2)$$

An electric field amplitude generated by the coherence of the vortex light fields is:

$$E_l(r,\theta)+E_{-l}(r,\theta)=2R_l(r)\cos(l\theta) \quad (3)$$

When the grating displaces, the +m-order diffracted light and the −m-order diffracted light will generate a phase difference Δϕ due to a Doppler shift effect of diffracted light, and the expression thereof is:

$$\Delta\phi = 4m\pi\frac{x}{p} \quad (4)$$

Where, x is the displacement that the grating displaces, and p is a grating pitch. The above formula shows that the grating displacement x can be solved by the phase difference Δϕ between the +m-order diffracted light and the −m-order diffracted light. At this moment, the electric field amplitude generated by the coherence of the two diffracted beams is:

$$E_l(r, \theta) + E_{-l}(r, \theta) = R_l(r)\{\exp[i(l\theta + \Delta\phi)] + \exp(-il\theta)\} \quad (5)$$
$$= 2R_l(r)\exp(i\Delta\phi/2)\cos(l\theta + \Delta\phi/2)$$
$$= 2R_l(r)\exp\left(i\frac{2m\pi x}{p}\right)\cos\left(l\theta + \frac{2m\pi x}{p}\right)$$

It can be seen from Formula (5) that the phase change Δϕ caused by the measured displacement amount x corresponds to a rotation angle of an equally angular distributed interference pattern, and the rotation direction corresponds to the measured displacement direction. In the vortex beam-excited precision grating displacement measurement method and apparatus, the displacement p/m of the measured displacement corresponds to the rotation of a circle 2π of an interference petal pattern, and then the rotation of 1° of the interference petal pattern corresponds to the measured displacement amount of p/360m.

The foregoing descriptions are merely preferred implementation manners of the present disclosure. It should be noted that those of ordinary skill in the art may make a number of improvements and refinements without departing from the principle of the present disclosure. These improvements and refinements should also be regarded as the scope of protection of the present disclosure. All components not specified in the embodiment can be implemented with the prior art.

What is claimed is:

1. A vortex beam-excited precision grating measurement method, the measurement method is based on a vortex beam-excited precision grating measurement apparatus, the measurement apparatus comprising an exciter, wherein a phase modulation device is arranged at an outlet of the exciter; a reflecting mirror is directly arranged in front of the phase modulation device; a grating is arranged on a left side of the reflecting mirror; the device further comprises two reflecting mirrors and three polarization beam splitting prisms, wherein the two reflecting mirrors are respectively a first reflecting mirror and a second reflecting mirror; the first reflecting mirror and the second reflecting mirror are arranged correspondingly up and down; the three polarization beam splitting prisms are respectively a first polarization beam splitting prism, a second polarization beam splitting prism, and a third polarization beam splitting prism, wherein the first polarization beam splitting prism and the second polarization beam splitting prism are located in one optical path; the first polarization beam splitting prism and the third polarization beam splitting prism are located in the other optical path; the three polarization beam splitting prisms are arranged at right angles; a first ¼ wave plate is arranged between the first polarization beam splitting prism and the second polarization beam splitting prism; a second ¼ wave plate is arranged between the first polarization beam splitting prism and the third polarization beam splitting prism; a first photoelectric detector and a second photoelectric detector are arranged on both sides of the second polarization beam splitting prism; and a third photoelectric detector and a fourth photoelectric detector are arranged on both sides of the third polarization beam splitting prism;

the phase modulation device is a spiral phase plate or a spatial light modulator;

a Dove prism is arranged between the grating and the second reflecting mirror;

the measurement method comprises the following steps that:

Step 1): emergent laser of the laser travels through a phase modulation device to generate a vortex beam; the vortex beam is reflected to a grating through a reflecting mirror and is diffracted to generate +m-order diffracted light and −m-order diffracted light; the laser emitted from the laser is converted into a Laguerre-Gaussian vortex beam carrying orbital angular momentum through a spatial light modulator, and the characteristics of the vortex beam are mainly characterized by a radial index n and an azimuth direction index l;

Step 2): the +m-order diffracted light enters a first polarization beam splitting prism after being reflected by the first reflecting mirror, and the −m-order diffracted light carries opposite topological charges after traveling through a Dove prism and then enters the first polarization beam splitting prism through a second reflecting mirror;

Step 3): light is divided into two beams through the first polarization beam splitting prism; in one light path, +m-order S light and −l-order P light travel through a first ¼ wave plate, and in the other light path, +m-order P light and −l-order S light travel through a second ¼ wave plate;

Step 4): the two paths of light respectively enter a second polarization beam splitting prism and a third polarization beam splitting prism again and then are divided into two beams again to respectively form circularly polarized light to interfere with each other, so as to generate four coherent patterns finally;

Step 5): when a grating displaces, the ±m-order diffracted light generates a phase difference $\Delta\phi$; at this moment, the phase change caused by a measured displacement amount corresponds to a rotation angle of an equally angular distributed interference pattern, and a rotation direction corresponds to a measured displacement direction; and the measured grating displacement can be demodulated from rotation angle information of the interference pattern;

Step 5) is as follows specifically:

vortex light field expressions with the azimuth direction indexes of l and −l are respectively abbreviated as:

$$E_l(r,\theta)=R_l(r)\exp(il\theta)$$

$$E_{-l}(r,\theta)=R_l(r)\exp(-il\theta)$$

an electric field amplitude generated by the coherence of the vortex light fields is:

$$E_l(r,\theta)+E_{-l}(r,\theta)=2R_l(r)\cos(l\theta)$$

when the grating displaces, the +m-order diffracted light and the −m-order diffracted light will generate a phase difference $\Delta\phi$ due to a Doppler shift effect of diffracted light, and the expression thereof is:

$$\Delta\phi = 4m\pi\frac{x}{p}$$

wherein, x is the displacement that the grating displaces, and p is a grating pitch; the above formula shows that the grating displacement x can be solved by the phase difference $\Delta\phi$ between the +m-order diffracted light and the −m-order diffracted light; at this moment, the electric field amplitude generated by the coherence of the two diffracted beams is:

$$E_l(r,\theta) + E_{-l}(r,\theta) = R_l(r)\{\exp[i(l\theta + \Delta\phi)] + \exp(-il\theta)\}$$
$$= 2R_l(r)\exp(i\Delta\phi/2)\cos(l\theta + \Delta\phi/2)$$
$$= 2R_l(r)\exp\left(i\frac{2m\pi x}{p}\right)\cos\left(l\theta + \frac{2m\pi x}{p}\right)$$

the phase change $\Delta\phi$ caused by the measured displacement amount x corresponds to a rotation angle of an equally angular distributed interference pattern, and the rotation direction corresponds to the measured displacement direction; and in the vortex beam-excited precision grating displacement measurement method, the displacement p/m of the measured displacement corresponds to the rotation of a circle of an interference petal pattern, and then the rotation of 1° of the interference petal pattern corresponds to the measured displacement amount of p/360m.

\* \* \* \* \*